United States Patent [19]

Sato

[11] 4,123,069
[45] Oct. 31, 1978

[54] MECHANICAL SEALING DEVICE

[75] Inventor: Akira Sato, Susono, Japan

[73] Assignee: Toyota Jidosha Kogyo Kabushiki Kaisha, Toyota, Japan

[21] Appl. No.: 733,309

[22] Filed: Oct. 18, 1976

[30] Foreign Application Priority Data

Jul. 23, 1976 [JP] Japan .............................. 51-97536[U]

[51] Int. Cl.² ............................................ F16J 15/36
[52] U.S. Cl. ....................................... 277/70; 277/88; 277/215; 277/DIG. 1
[58] Field of Search ...................... 277/88, DIG. 1, 70, 277/22, 15, 215, 94

[56] References Cited

U.S. PATENT DOCUMENTS

| 2,992,842 | 7/1961 | Shevchenko et al. | 277/DIG. 1 |
| 3,515,394 | 6/1970 | Stevens | 277/88 |
| 3,905,605 | 9/1975 | Hübner | 277/22 |

Primary Examiner—Richard E. Aegerter
Assistant Examiner—L. Footland
Attorney, Agent, or Firm—Stevens, Davis, Miller & Mosher

[57] ABSTRACT

A mechanical sealing device for use with a rotary shaft extending through stationary casings. In this sealing device, first and second stationary ring members are arranged in surrounding but concentric relation to the rotary shaft, with a resilient bellows interposed therebetween, and a rotatable ring member is fitted on the rotary shaft. The first ring member is affixed to one of the casings while the second ring member is urged against the rotatable ring member by means of the resilient bellows in sliding relation thereto. A plurality of radial passages are defined in the rotatable ring member, so that cooling medium may be fed in the radial passages for cooling the rotatable ring member rather than sprayed over the surface of the rotatable ring member. In addition, the rotatable ring member is formed with an annular lead-in or guide portion having inner and outer conical peripheral surfaces for smoothly admitting injected cooling medium in the radial passages provided in the rotatable ring member. A nozzle for injecting the cooling medium therethrough is directed into an entrance of the annular lead-in portion for the radial passages.

7 Claims, 5 Drawing Figures

MECHANICAL SEALING DEVICE

BACKGROUND OF THE INVENTION (a) Field of the Invention

This invention relates to a mechanical sealing device, and more particularly to a cooling mechanism for use with a mechanical sealing device for a rotary shaft rotating at a high speed.

(b) Description of the Prior Art

In prior art mechanical sealing devices, a rotary shaft extends through stationary casings, and an attaching ring and a seal ring are arranged in surrounding but concentric relation to the rotary shaft with a resilient bellows interposed therebetween. The attaching ring is affixed to one of the casings, while the seal ring is urged against a mating ring fitted on the rotary shaft by means of a resilient bellows in sliding relation thereto. Sliding contact of the seal ring with the mating ring produces heat due to friction and thereby raises the temperature of the rings.

In an effort to solve this heating problem, oil is sprayed over the surface of the mating ring for cooling same. However, such spraying does not completely cool the mating ring.

For better understanding of the sealing device according to the present invention, a prior art mechanical sealing device will be described in more detail with reference to FIG. 1.

A prior art mechanical sealing device in general consists of: a mating ring 1 which is fitted on a rotary shaft 8 and rotated together therewith; a seal ring 2 having a surface adapted to abut the surface of the mating ring 1 on its one side; a supporting ring 3 for supporting the seal ring 2 on its back surface; a mechanical-seal-outer cylinder 4 fitted in a casing 6; and a resilient bellows 5 whose sides are sealingly coupled to the supporting ring 3 and mechanical-seal-outer cylinder 4. The outer cylinder 4 is fitted in an annular groove defined in the wall of a bore in the stationary casing 6 with an O-ring 17 interposed between the outer cylinder 4 and the casing 6 for maintaining a seal therefor. The casing 6 is fastened to another casing 7 by means of bolts and nuts not shown. The rotary shaft 8 extends through the casings 6, 7 and is supported by known bearing means (not shown) which are rigidly fitted in the casings 6, 7. The mating ring 1 is fitted on the shaft 8 on its boss position, and is urged against an annular shoulder portion of the shaft 8 in the axial direction by means of a spacer 9 to thereby rotate tpgether with the spacer 9 and the shaft 8. As has been described earlier, the seal ring 2 is supported by the supporting ring 3 which in turn is coupled to one edge of the resilient bellows 5, the other edge thereof being coupled to a flange 4a of the outer cylinder 4 affixed to the casing 6. Thus, the seal ring 2 remains stationary. Accordingly, spaces 10 and 11 defined on the axially opposite sides of the mechanical seal device are sealed from each other by means of the mating ring 1, seal ring 2, bellows 5, and outer cylinder 4, the bellows 5 urging the seal ring 2 against the surface of the mating ring 1.

Relative sliding contact of the seal ring 2 with the mating ring 1 produces heat due to friction. In an effort to solve this heating problem, oil is sprayed in the form of jet 15 through a nozzle 14, communicated with an oil passage 13 provided in the casing 7, over the back surface of the mating ring 1 to thereby cool it. After cooling, oil is discharged outside through a drain 16 provided in the casing 7.

For enhancing the sealing effect of the mechanical sealing device of the type shown in FIG. 1, the force to urge the seal ring 2 against the mating ring 1 should be increased. However, an increase in that force leads to an increase in the amount of heat produced due to friction. The seal ring 2 in general is however made of a heat resistant and abrasion-resistant material, such as carbon. On the other hand, the mating ring 1 is made of a metal, taking into consideration the combined use with the type of material forming the seal ring and its strength upon high speed rotation. In addition, the sliding surface of the mating ring 1 is subjected to a surface-hardening treatment such as carburizing and nitriding. Accordingly, if the force to urge the seal ring 2 against the mating ring 1 is extremely high, or if the rpm of the mating ring is increased, then the amount of heat produced due to friction is increased. This increase in turn leads to an increase in temperature of the mating ring, lowering in hardness, or seizure of the sliding surface of the mating ring 1, resulting in shortened service life or premature failure. To overcome these shortcomings, oil is sprayed over the surface of the mating ring 1 to cool same. However, when the rpm of the rotary shaft is increased, to say as high as several hundred thousand rpm, then oil sprayed on the mating ring 1 fails to cling to the surface of the mating ring 1, because of the extremely high peripheral speed of the mating ring 1, i.e., the extremely large centrifugal force acting on the oil jets. For this reason, oil fails to flow along the surface of the mating ring 1 in contact therewith, thus lowering the cooling effect.

For improving the cooling effect of the mechanical sealing device having the aforesaid arrangement, the amount of oil being supplied can be increased by raising the pressure of the oil. However, if the amount of the oil being supplied is increased excessively, then the oil fills around the mating ring, because the oil cannot flow through the drain at a rate equal to or faster than the oil being supplied. This draining problem leads to another problem of increased friction between the surfaces of the mating ring and the oil in contact therewith when the mating ring rotates at high rpm.

SUMMARY OF THE INVENTION

It is a principal object of the present invention to provide a mechanical sealing device which results in improved effective cooling of a mating ring.

According to the present invention, there is provided a mechanical sealing device, in which a plurality of radial passages are defined in a rotatable ring member or a mating ring for introducing cooling oil therein. More particularly, the mating ring comprises two ring portions which are mated with each other, while radially running built-up portions or grooves are provided in or on the surface of one of the ring portions, thereby providing radial passages along the two mating surfaces of the two ring portions. In addition, the mating ring is formed with annular lead-in or guide portions having inner and outer conical peripheral surfaces for smoothly admitting injected cooling oil into the radial passages. Also, a nozzle for injecting cooling oil therethrough is open into an entrance of the annular lead-in portion for the radial passages in the mating ring.

DESCRIPTION OF THE PREFERRED EMBODIMENTS

Figure 1:
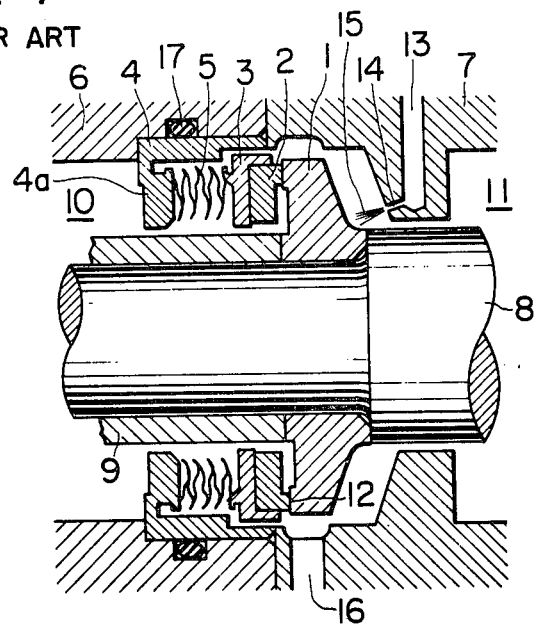
FIG. 1 is a cross-sectional view taken along the length of a rotary shaft in a prior art mechanical sealing device.
Figure 2:
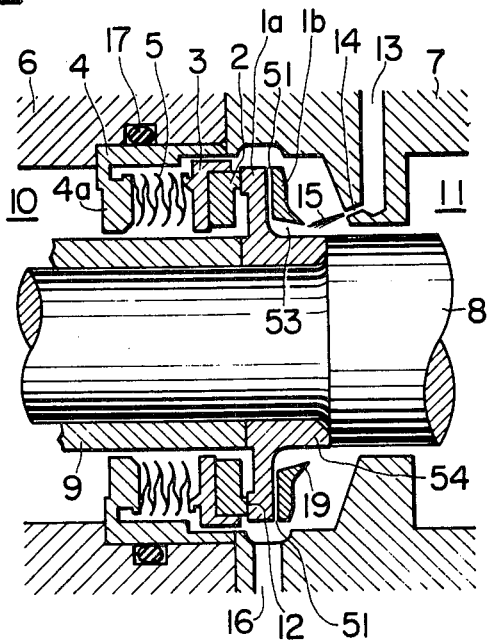
FIG. 2 is a cross-sectional view taken along the length of a rotary shaft in the mechanical sealing device according to the present invention.

Referring to FIG. 2, there is shown one embodiment of a mechanical sealing device according to the present invention. In this figure, like parts are designated with like reference numerals to those in FIG. 1.

As shown in FIG. 2, a seal ring 2 is supported by a supporting ring 3. A flange portion 4a of an outer cylinder 4 and the supporting ring 3 have a resilient bellows 5 interposed therebetween to thereby form a body portion of the mechanical sealing device. The outer cylinder 4 is fitted in a groove defined in the inner surface of the casing 6, and sealed with an O-ring 17. Another casing 7 is fastened to the casing 6 by means of bolts and nuts not shown.

A rotary shaft 8 extends through the casings 6 and 7 and is supported by known bearing means not shown. Thus, spaces 10 and 11, defined on the opposite sides of the mechanical sealing device within the casing 6 and 7, are sealed with a mechanical seal thus formed in oil-tight relation. A mating ring comprises two ring portions 1a, 1b, and a boss portion 54 fitted on the rotary shaft 8. The boss portion 54 of the mating ring is urged in the axial direction against an annular shoulder portion of the shaft 8 by means of a spacer 9.

Figure 3:
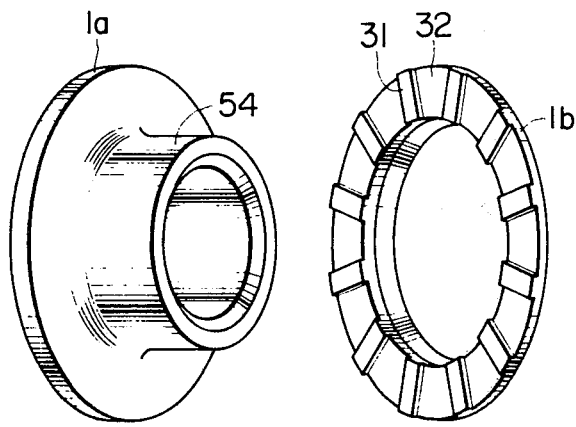
FIG. 3 is an exploded view of a mating ring comprising two ring positions according to the present invention.
Figure 4:
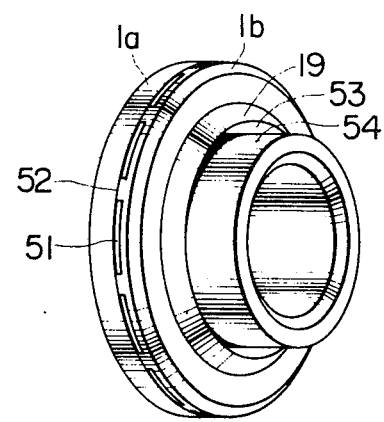
FIG. 4 is a mating ring according to the present invention shown in its assembled condition.

Referring to FIG. 3, there is shown an exploded view of the mating ring comprising the two ring portions 1a, 1b. As shown, radial built-up portions 31 and grooves 32 are formed on the surface of the ring portion 1b, which surface mates with the surface of the other ring portion 1a.

The two ring portions 1a, 1b are mated coaxially and then subjected to electron beam welding which is applied to abutting portions 52 of the ring portion 1b mated with the ring portion 1a.

As a result, there are provided radial passages or grooves 51 between the ring portions 1a, 1b. An annular lead-in or guide portion 19 having inner and outer conical peripheral surfaces is formed on the back surface of the ring portion 1b. The lead-in portion 19 has an inner diameter suitably larger than the outer diameter of the boss portion 54 of the ring portion 1a. The lead-in portion 19 extends rearwardly, i.e., away from the bellows 5, and the inner diameter of the portion 19 is progressively increased towards the bellows 5. The lead-in portion 19 serves to smoothly introduce injected oil from a nozzle 14, communicated with an oil passage 13 defined in the casing 7, into the radical passages 51. The nozzle 14 opens into an annular space 53 defined between the lead-in portion 19 and the boss portion 54 of the ring portion 1a. The annular space 53 is communicated with radial passages 51.

Oil under pressure is fed from an oil supply means not shown into the oil passage 13 provided in the casing 7. Then, the oil is injected through the nozzle 14 into the annular space 53 in the form of oil jets 15. Accordingly, almost the entire amount of oil injected may be introduced into the annular space 53 defined between the lead-in portion 19 of the ring portion 1b and the boss portion 54 of the ring portion 1a. The radial width of the annular space 53 progressively increases towards the bellows 5 to thereby provide a conical inner peripheral surface for the lead-in portion 19. As a result, when the mating ring, or ring portions 1a, 1b are rotated at high rpm, oil clinging to the inner peripheral surface of the lead-in portion 19 may advance into the radial passages 51 by centrifugal force, rather than returning to the tip of the lead-in portion 19. The radial flow of the cooling oil along the radial passages 51 may effectively cool the ring portions 1a, 1b, i.e., mating ring, so that the cooling oil will not be repelled from the surface of the mating ring 1 because of its high rpm.

Figure 5:
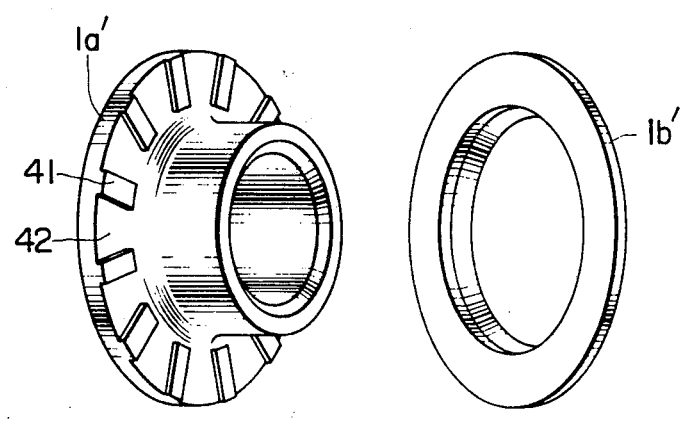
FIG. 5 is an exploded view of one modification of the mating ring according to the present invention.

FIG. 5 shows another embodiment of the invention, in which a ring portion 1a' is provided with radial built-up portions 41 on its surface which mates with a ring portion 1b'. Thus, when the ring portions 1a', 1b' are assembled, radial passages or grooves 42 are formed in the mating ring.

As is apparent for the foregoing description, the mechanical sealing device according to the present invention has the following advantages:

1. Since the cooling oil flows through narrow passages in the mating ring in the radial direction, improved cooling of the mating ring is achieved;
2. A number of oil jets may effectively contribute to the cooling so that the amount of oil required may be reduced to a large extent;
3. There is minimal loss due to friction between the oil and the rotating surfaces of the mating ring which is rotating at high speed, the loss being caused by a cooling oil filling around the mating ring;
4. Improvement in the cooling effect of the mating ring permits the sliding speed of the mating ring relative to the seal ring to be increased, thus allowing the mechanical sealing device to be used for a shaft rotating at much higher rpm; and
5. Improvement in the cooling effect of the mating ring allows the force to urge the seal ring against the mating ring to be increased so that high pressure and high vacuum sealing may be achieved.

While the present invention has been described herein with reference to certain exemplary embodiments thereof, it should be understood that various changes, modifications, and alterations may be effecfted without departing from the spirit and scope of the present invention as defined in the appended claims.

I claim:

1. The combination of casings, a rotary shaft rotatable at high rpm and extending through said casings, and a mechanical sealing device, said sealing device comprising:
   first and second stationary ring members arranged in surrounding and concentric relation to the rotary shaft;
   a resilient bellows interposed between said first and said second stationary ring members;
   a rotatable ring structure on the rotary shaft, said rotatable ring structure comprising third and fourth ring members rotatable together as a unit, said third ring member comprising a sleeve-shaped boss portion disposed around the rotary shaft and a disc portion extending radially outwardly from said boss portion, said disc portion being substantially radially coextensive with said fourth ring member;

said first ring member being affixed to one of said casings;

said second ring member being urged against said rotatable ring structure in sliding relation thereto by said bellows;

means defining a plurality of radially extending passages between said third and fourth ring members, each of said passages being substantially perpendicular to the axis of said rotary shaft and extending substantially from the radially inner end to the radially outer end of the fourth ring member and of the disc portion of the third ring member;

a supply port defined in one of said casings for a cooling medium, said port being open to the radially inner end of said radially extending passages.

2. The combination including mechanical sealing device as set forth in claim 1, wherein said third and fourth ring members are mated with each other, one of said third and fourth ring members being formed with annular built-up portions on its mating surface to thereby provide the radial passages between said third and fourth ring members.

3. The combination including a mechanical sealing device as set forth in claim 2, wherein:

said fourth ring member comprises an annular guide portion of the surface thereof most distant from the bellows, said guide portion having inner and outer conical peripheral surfaces with the inner diameter of said guide portion increasing progressively in a direction toward said bellows, and said guide portion defining an annular space with said boss portion of the third ring member.

4. The combination including a mechanical sealing device as set forth in claim 3, wherein:

said supply port comprises a nozzle for injecting cooling medium therethrough, said nozzle opening into said annular space.

5. The combination including a mechanical sealing device as set forth in claim 8, wherein said third and fourth ring members are mated with each other, one of said third and fourth ring members being formed with radial grooves in its mating surface to thereby provide the radial passages between said third and fourth ring members.

6. The combination including a mechanical sealing device as set forth in claim 3, wherein:

said fourth ring member comprises an annular guide portion on the surface thereof most distant from the bellows, said guide portion having inner and outer conical peripheral surfaces with the inner diameter of said guide portion increasing progressively in a direction toward said bellows, and said guide portion defining an annular space with said boss portion of the third ring member.

7. The combination including a mechanical sealing device as set forth in claim 6, wherein:

said supply port comprises a nozzle for injecting cooling medium therethrough, said nozzle opening into said annular space.

* * * * *

UNITED STATES PATENT AND TRADEMARK OFFICE
CERTIFICATE OF CORRECTION

PATENT NO. : 4,123,069
DATED : October 31, 1978
INVENTOR(S) : Akira SATO

It is certified that error appears in the above-identified patent and that said Letters Patent are hereby corrected as shown below:

Please make the following corrections to the claims:

Claim 3, line 4, change "of" to --on--.

Claim 5, line 2, change "8" to --1--.

Signed and Sealed this

Twentieth Day of February 1979

[SEAL]

Attest:

RUTH C. MASON
Attesting Officer

DONALD W. BANNER
Commissioner of Patents and Trademarks